United States Patent [19]

Zwirn

[11] 4,318,129

[45] Mar. 2, 1982

[54] AUTOMATIC LEVEL AND GAIN CONTROL SYSTEM

[75] Inventor: Robert Zwirn, Los Angeles, Calif.

[73] Assignee: Hughes Aircraft Company, Culver City, Calif.

[21] Appl. No.: 164,728

[22] Filed: Jun. 30, 1980

[51] Int. Cl.³ .............................................. H04N 5/52
[52] U.S. Cl. .................................... 358/174; 358/169
[58] Field of Search ................................ 358/174, 169

[56] References Cited

U.S. PATENT DOCUMENTS 3,569,620  3/1971  Baun ..................................... 358/174
3,914,545 10/1975  Engel ..................................... 358/169

*Primary Examiner*—Richard Murray

*Attorney, Agent, or Firm*—Leonard A. Alkov; W. H. MacAllister; W. J. Adam

[57] ABSTRACT

An automatic level and gain control system operable with a sensor to match the dynamic range of the display or other processing elements to the signal provided by the sensor for developing an image with improved dynamic range utilization (or contrast). Peak detection is provided with a conditional integrator so that the effect of high level narrow peaks is substantially suppressed. This system rapidly reaches and maintains a condition of providing the video signal to the display (or other processing) at a desired voltage level and over a desired dynamic range to continually maintain an image having optimum contrast within the dynamic range limitations of the processor or display system.

7 Claims, 5 Drawing Figures

AUTOMATIC LEVEL AND GAIN CONTROL SYSTEM

TECHNICAL FIELD

This invention relates to sensing and display systems and particularly to an automatic level and gain control system to provide a signal processor function to the sensor that results in an improved utilization of dynamic range to the display or other signal processing operations.

CROSS REFERENCE TO RELATED APPLICATIONS

The conditional integrater utilized in the system of this invention is similar to the one utilized in the system of Ser. No. 106,563, filed Dec. 26, 1979 and invented by Robert Zwirn.

BACKGROUND OF THE INVENTION

1. Field of the Invention

One of the long standing problems associated with display of information received from a scene is that the imagery presented by the cathode ray tube does not have a sufficiently high contrast. Imagery with a high contrast is especially necessary for detection and recognition of ground targets such as when an operator in an aircraft or helicopter slews his line of sight during a ground search. If the video which may be from an infrared detector system is not optimal, during an entire ground search, many potential targets are not detected or recognized by processing elements or by an operator. A display system, for example, characteristically has a much smaller dynamic range than the sensor and therefore superfluous sensor data should not be presented for display. If the output from the sensor were applied to the display so as to occupy the entire dynamic range of the display (black to white) a high contrast and easily readable picture would be provided.

2. Description of the Prior Art

The function of controlling the level and gain of the display which is performed automatically by the system of the invention was previously done manually by the operator controlling two potentiometers. Manual control to optimize the video is usually updated only when the signal is substantially degraded, especially when the operator is engaged in slewing the line of sight and searching for targets. Thus the prior art systems did not continuously provide a desirable high contrast video.

SUMMARY OF THE INVENTION

It is therefore an object of this invention to provide improved high contrast video for processing or for display.

It is a further object of this invention to optimize the video received from a sensor for processing or display.

It is another object of this invention to provide a system for automatically and continually matching the dynamic range of sensor data to the dynamic range of the processing unit or the display.

It is still another object of this invention to provide a system that provides optimal high contrast imagery to the elements of the system, including a display, by proper processing of the sensor data.

The automatic level and gain control system in accordance with the invention determines the dynamic range of interest for the sensor output video which is typically the video from the center portion of the field of view, such as the center one-third. The system develops a correct gain control signal so that the sampled video traverses the entire display dynamic range from black to white. The video from the sensor is sampled and peak detected with conditional integraters in both the positive and negative directions to determine its non-point source extremes. The conditional integrators provide a selected time constant and function to allow the input to contribute to the integrated value only if they exceed the value of the present integrated value. A closed loop from the conditional integrators to a level control circuit maintains the video operating point at a voltage halfway between the integrated extremes. The difference between the extremes is compared to the required output difference and the gain of the gain control circuit is controlled so that the output video signal has a dynamic range that extends over the entire dynamic range of the display system or the video processing unit such as a tracker unit.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings in which like reference numbers refer to like parts and in which:

DETAILED DESCRIPTION OF THE INVENTION

Figure 1:
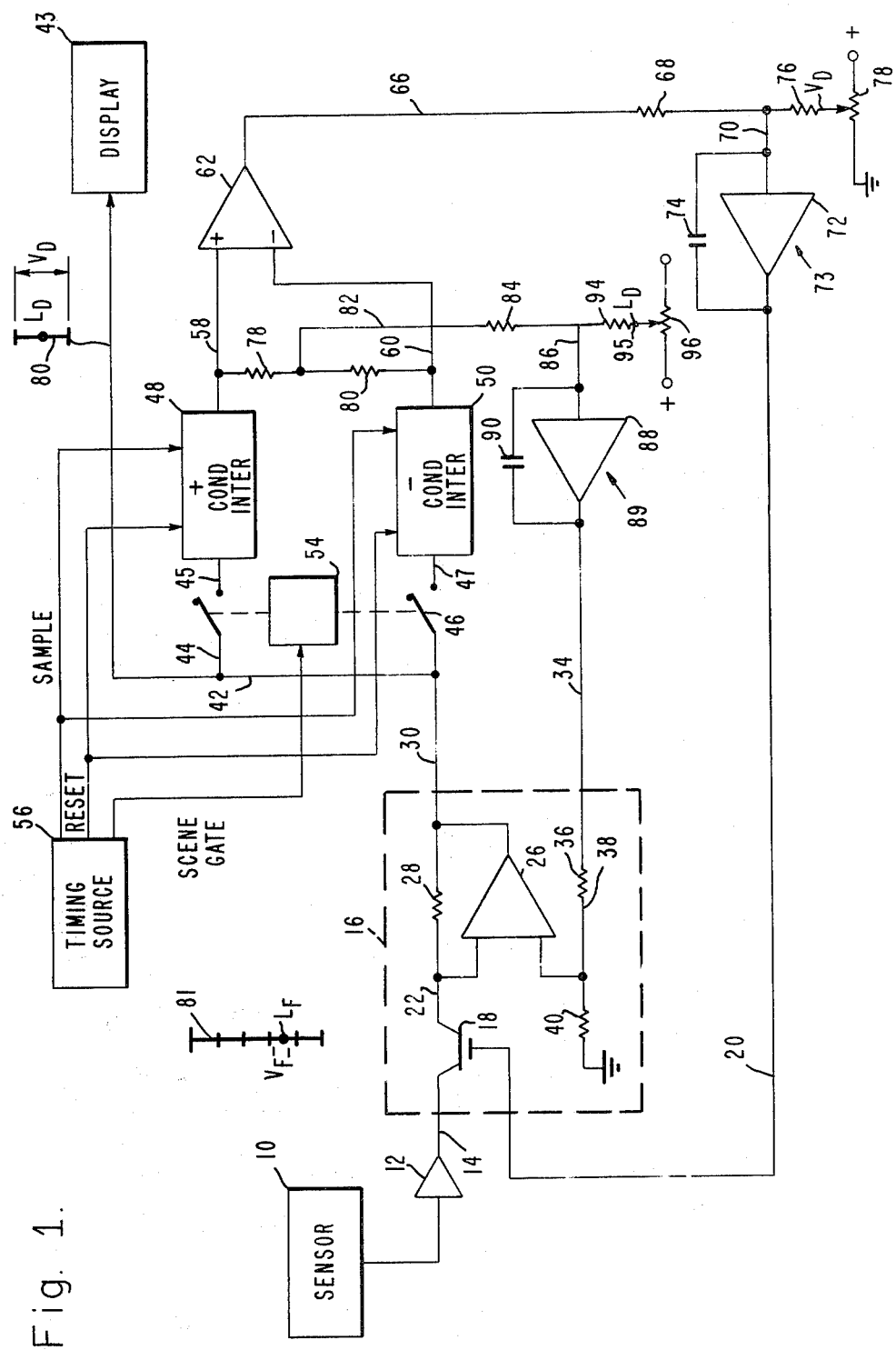
FIG. 1 is a simplified schematic circuit and block diagram of the level and gain control system in accordance with the invention.

Referring first to FIG. 1, the level and gain control system in accordance with the principles of the invention responds to video signals from a sensor 10 which may be of any suitable type such as an infrared detector, detectors operating in the visable band, a laser system, a television scanner or a radar transmitter and receiver. The video signal is then amplified in an amplifier 12 which may include a suitable pre-amplifier and a post-amplifier, and is then applied through a lead 14 to a level and gain control circuit 16. In order to control a gain $V_D$ of the video signal, the lead 14 is coupled to the drain electrode of a FET (Field Effect Transistor) 18 having its gate electrode coupled to a gain control lead 20 and its source electrode coupled to a lead 22 which in turn is coupled to one input of an amplifier 26. The lead 22 is coupled through a resistor 28 to a lead 30, the latter also being coupled to the output of the amplifier 26. For controlling a level $L_F$ of the input video signal to correspond to the desired level for display $L_D$, a level control lead 34 is coupled through a divider including a resistor 36, a lead 38 and a resistor 40 in turn coupled to ground. The lead 38 is coupled to a second input of the amplifier 26 so that the video signal level on the lead 30 is a function of a constant times the difference between the actual video signal level ($L_F$) and the desired signal level ($L_D$) on a lead 95. It is to be understood that the level and gain control circuit 16 is only a simplified illustrative example of one type that may be utilized in the system of the invention.

The level shifted and gain controlled signal on the lead 30 is also applied to a lead 42 and in turn to subsequent processors or units such as a display unit 43 which may also include a scan converter. The signal on the lead 42 is also applied to scene gating switches 44 and 46 and in turn to respective positive peak and negative peak conditional integrators 48 and 50 which provide a peak detecting function. An illustrative switch control unit 54 for controlling the switches 44 and 46 receives scene gate pulses from a timing source 56 so that only a portion of the scene is applied to the conditional peak detectors 48 and 50, which portion may be the central one-third of the scene display raster. The conditional integrators 48 and 50 also receive reset pulses and sample timing pulses from the timing source 56. The outputs of the conditional integrators 48 and 50 are applied through respective leads 58 and 60 to the respective positive and negative input terminals of a differential amplifier 62 having its output terminal coupled through a lead 66, a resistor 68 and a lead 70 to the input of an amplifier 72 of an integrator 73 for forming a suitable servo loop. A capacitor 74 is coupled across the amplifier 72 between the lead 70 and the gain control lead 20 for applying the integrator gain control signal to the circuit 16. For selecting the desired output voltage difference for the dynamic range of the processing or display 43, the lead 70 is coupled through a resistor 76 to a dynamic range selecting potentiometer 78 having a resistor coupled between a suitable negative terminal and ground. The dynamic range selecting potentiometer 78 allows selection of the voltage range $V_D$ for the subsequent processor or display unit 43 as shown by diagram 80, thus allowing the dynamic range to be initally matched to the display. A diagram 81 shows the level $L_F$ and the dynamic range $V_F$ of the video signal as provided by the sensor 10.

For determining the central level of the video signal and feeding back a signal to force the central level to $L_F$, resistors 78 and 80 each of equal value are coupled between the leads 58 and 60. A lead 82 is coupled from between resistors 78 and 80 through a resistor 84 to a lead 86 which in turn is coupled to the input of an amplifier 88 of an integrator 89 for forming a suitable servo loop. An integrating capacitor 90 is coupled from the lead 86 to the level control lead 34 which in turn is coupled to the output of the integrating amplifier 88. The lead 86 is also coupled through a resistor 94 and the lead 95 to a level selecting potentiometer 96 having a resistor coupled between suitable positive and negative sources of potential. The level selecting potentiometer 96 controls the setting of the desired level $L_D$ on the lead 95 and of the signal at the display as shown by diagram 80 by forcing the video signal to the correct level $L_F$ as shown by the diagram 81.

Figure 2:
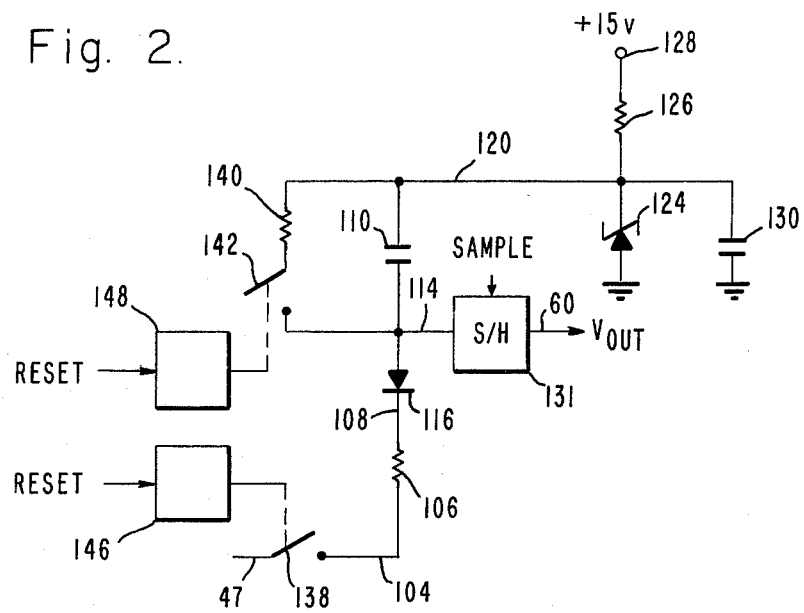
FIGS. 2 and 3 are respectively schematic circuits of a negative peak and a positive peak conditional integrator used in the system of FIG. 1.

Referring now to FIG. 2, the negative peak conditional integrator 50 includes a gate 138 coupled between the lead 47 and a lead 104 which in turn is coupled through a timing resistor 106 to a lead 108. An integrating capacitor 110 has one terminal coupled through a lead 114 and the anode to cathode path of a charging diode 116 to the lead 108. A lead 120 is coupled to the other terminal of the integrating capacitor 110 and is biased by being connected to a zener diode 124 which is in turn coupled through a resistor 126 to a +15 volt terminal 128. The zener diode 124, which is referenced to ground potential, is biased in its avalanche region so that approximately 9 volts is maintained on the lead 120, for example. A bypass capacitor 130 is also coupled between the lead 120 and ground potential to maintain a constant DC voltage on the lead 120. A sample and hold circuit 131 has its input terminal coupled to the lead 114 to allow periodic sampling and storing of the integrated peak values in response to sample pulses. For resetting the detector, the leads 114 and 120 are coupled together through a resistor 140 and a switch 142 for discharging capacitor 110. The RESET signal from the timing source 56 of FIG. 1 is applied to switch control units 146 and 148 for controlling the respective switches 138 and 142.

In the operation of the negative peak conditional integrator, a positive voltage $V_z$ is maintained on the lead 120 and the voltage at the start of integration on the lead 120 and the voltage at the start of integration on the lead 104 is $V_z - V_{DIODE}$ where $V_{DIODE}$ is the voltage drop across the diode 108. At the start of integration, the signals are applied to the lead 108, the integrating capacitor 110 responds to the negative peaks of the signals and starts to charge to provide an increasing negative voltage on the lead 114 as the diode 116 conducts. However, the integration is conditional because only signals on the lead 108 that are more negative than the currently integrated value represented by the charge on the integrating capacitor 110, cause the diode 116 to conduct and provide integration. Thus, the conditional integrator act to integrate the difference between its input and its output values which provides integration with substantial noise suppression and operation in response to video signals having a relatively small dynamic range. By intentionally degrading the rise time of the peak detector, it has good suppression characteristics for extreme point sources so that they only contribute with a reduced amplitude to the integrated value on the capacitor 110.

Figure 3:
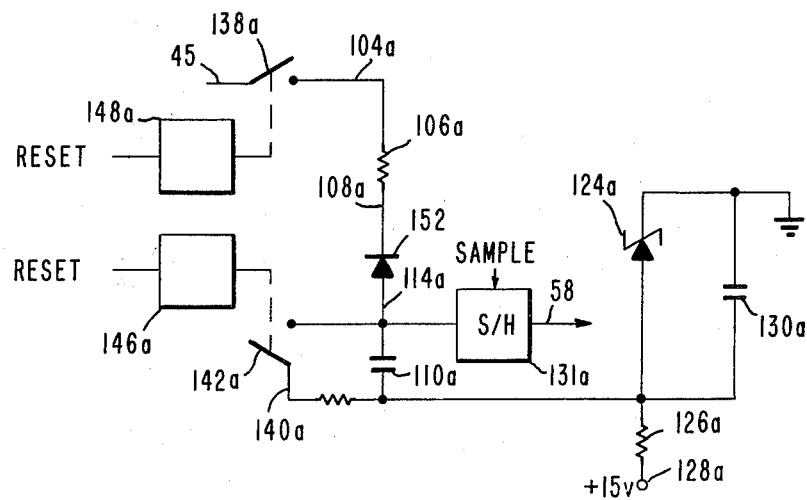

Referring now to FIG. 3, the positive peak conditional integrator 48 is similar to the integrator 50 except that the diode 116 is reversed. Diode 152 in FIG. 3 corresponds to diode 116 of FIG. 2. The other elements of the circuit of FIG. 3 that are common to the elements of FIG. 2 are given the same reference numerals except with the subscript "a", for clarity of explanation. The charging diode 152 has its anode to cathode path coupled between a lead 108a and a lead 114a so that an integrating capacitor 110a charges positively in response to positive video signals applied to the lead 108a. Thus the positive conditional integrator 48 of FIG. 3 operates in a similar manner to that of FIG. 2 and need not be explained in further detail.

Figure 4:
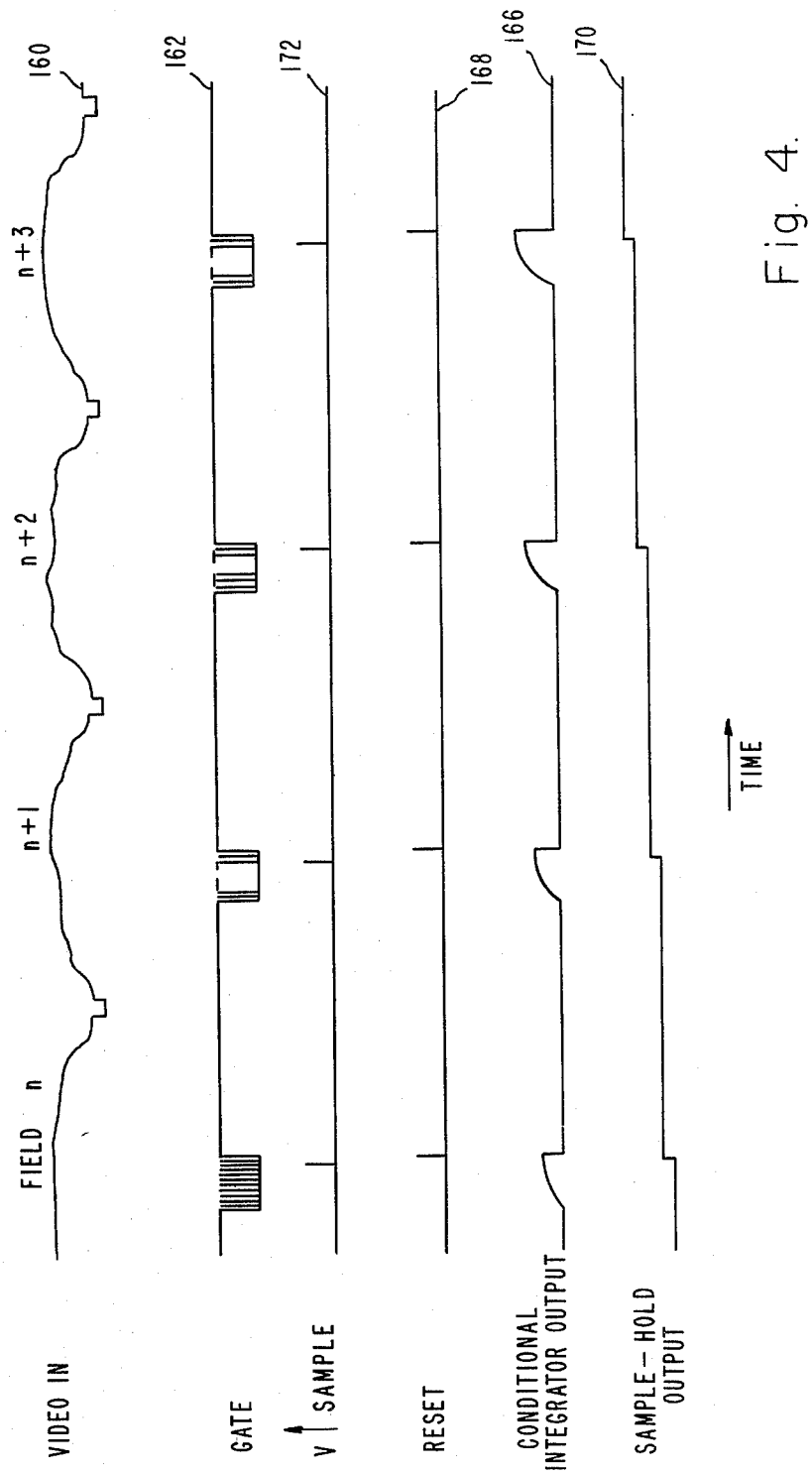
FIG. 4 is a schematic diagram of waveforms of voltage as a function of time for explaining the field to field gating and the operation of the system of FIG. 1.

Referring now to the waveforms of FIG. 4 as well as to FIG. 1, the operation of the automatic level and gain control circuit will be further explained. The video signal provided by the sensor 10 on the lead 14 is shown by a waveform 160 for fields n, n+1, n+2 and n+3. The gating of a portion of a field or raster at the switches 44 and 46 is provided by a waveform 162 which may define any selected portion such as a central one-third portion of each field to be displayed. The width of the pulses of the waveform 162 determines the number of lines of data in the vertical dimension that are passed into the conditional integrators 48 and 50. Gating of a portion of each line to the conditional integrators will be explained subsequently relative to FIG. 5. The positive conditional integrator output is shown by a waveform 166 and during the gating period of the pulses of the waveform 166, the capacitor 110a (FIG. 3) charges to a conditional peak value until it is reset in response to a reset pulse of a waveform 168. The positive output of the sample and hold circuit 130a is shown by waveform 170 with the sampling being controlled by a sample pulse of a waveform 172. The sample and hold, output signal of the waveform 170 is shown changing to an improved contrast condition over four fields. The negative conditional integrator 50 operates in a similar manner except that the waveforms 166 and 170 are inverted. The integrators 73 and 89 thus respond to the changing value at the output of the sample and hold circuits 131 and 131a to change the respective gain and level of the input video signal to the desired respective values $V_D$ and $L_D$.

Figure 5:
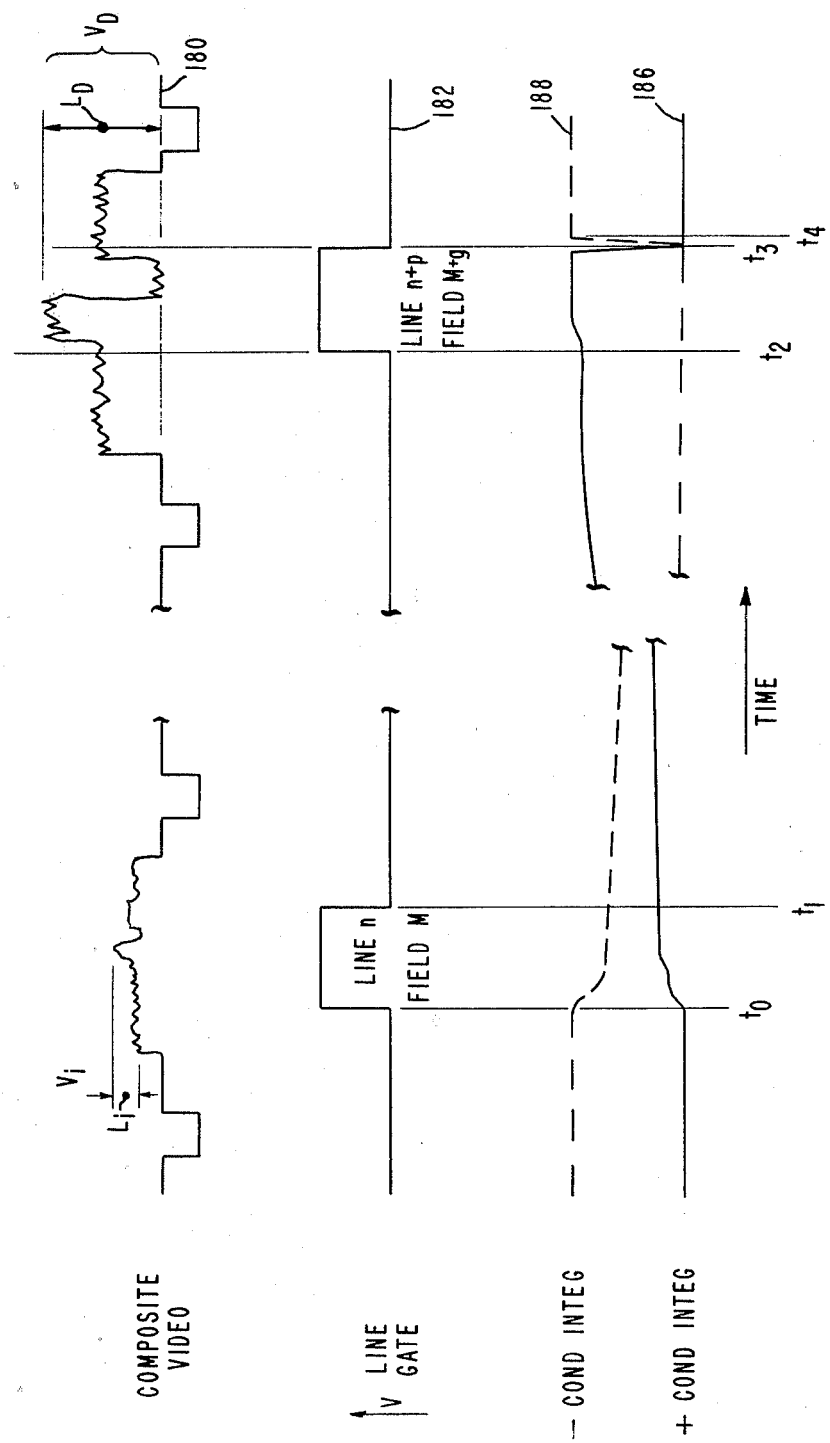
FIG. 5 is a schematic diagram of waveforms of voltage as a function of time for further explaining the operation of the conditional integrators in the system of FIG. 1.

Referring now to FIG. 5 as well as to FIG. 1, the operation of this system of the invention during line periods over several fields will be further explained. The raw composite video signal on the lead 42 is shown by a waveform 180 having an initial level $L_i$ and initial voltage difference $V_i$. The gating is in response to a line gate pulse of a waveform 182 which for purposes of illustration is for line n field m at a time $t_0$ and can be considered a first line of the gated one-third of a first field. In response to the video signal of the waveform 180 at the time $t_0$, the negative conditional integrator 50 which is assumed to be at a positive value starts to integrate in a negative direction as shown by a waveform 186. The positive integrator 48 which is assumed to be at a negative value integrates positively in response to the first line as shown be a waveform 188. This integration occurs until the gate pulse of the waveform 182 falls to a low level at a time $t_1$. Between times $t_1$ and $t_2$ a number of fields of lines are integrated and the outputs of the sample and hold circuits of the conditional integrators gradually changes to levels to bring the video signal to a desired level $L_D$ and a desired dynamic range $V_D$ at the time $t_2$. Between times $t_2$ and $t_3$ the gate pulse of the waveform 182 may be assumed to be the last line n+p of the central one-third portion of a field m+g and the video is corrected to the desired level $L_D$ and over the desired display dynamic range $V_D$. Thus during the period of several fields the system feeds back to the level and gain control circuit 16, sampled correction signals through the integrators 89 and 73 to bring the video signal to the desired level and the dynamic range. Between the times $t_1$ and $t_2$, near the end of each gated central portion of each field, the sample pulse of the waveform 172 of FIG. 4 samples the voltages of the waveforms 186 and 188 to store the conditional peak integrated values to be utilized for the remainder of that field and during the next initial field portion of video data. It is to be noted that between times $t_1$ and $t_2$, samples are stored at the end of each gate as derived by the conditional integrators from the improving video signal of the waveform 180. Between times $t_1$ and $t_2$ at the end of each gated central field portion and at a time $t_4$, the reset pulse of the waveform 168 of FIG. 4 resets the conditional integrators 48 and 50 and the conditional integrators will start to integrate the next field when the central one-third portion of video is received. The sample and hold circuits 131 and 131a maintain the correction voltages until the next sample period while the conditional integrators 48 and 50 again charge to values in response to the video signal from the central one-third of the field. Thus, at the end of each sample period field portion, the peak output values of the conditional integrators 48 and 50 are sampled and the conditional integrators are then reset for integrating the next sample period field portion. Once the system reaches the desired condition as shown at the time $t_3$, that condition is maintained by the conditional integrators 48 and 50, charging during each field sample period (which may be the central one-third of the field) to approximately the same value. Therefore, when operating near the desired video condition, the sample and hold circuits 131 and 131a store substantially the same voltage values. The integrator 89 responds to the average between the outputs of the conditional integrators 48 and 50 to maintain the desired level of the video signal and the integrator 73 responds to the difference between the voltages on the leads 58 and 60 to maintain the desired dynamic range of the video signal.

What is claimed is:

1. A level and gain control system responsive to a video signal received from a scene for controlling the level and dynamic range of said video signal comprising:

a control circuit responsive to said video signal for controlling the level and gain of said video signal, positive and negative conditional integrators, coupled in parallel to said control circuit, for respectively detecting the positive and negative conditionally integrated peaks of said video signal as a function of the peak voltages of said video signal, first integrator means coupled to said positive and negative conditional integrators for establishing the median level of the output signals therefrom, said first integrator means being coupled to said control circuit for controlling the level of said video signal, second integrator means coupled to said positive and negative conditional integrators for integrating the difference of the output signals from said first and second integrator means and coupled to said control circuit for controlling the dynamic range of said video signal, and output means coupled to said control circuit for receiving the video signal having a controlled level and dynamic range.

2. The combination of claim 1 in which the coupling between said positive and negative conditional integrators and said first integrator means includes a voltage divider coupled between output terminals of said positive and negative conditional integrators and having a center tap coupled to said first integrator means, and the coupling between said positive and negative conditional integrators and said second integrator means includes a differential amplifier coupled from said positive and negative conditional integrators to said second integrator means.

3. The combination of claim 1 including a level adjusting voltage source and a dynamic range adjusting voltage source and in which the input coupling of said first and second integrator means respectively include first and second voltage dividers with a center tap coupled to the respective first and second integrator means, a first end coupled to said positive and negative conditional integrators and a second end respectively coupled to said level adjusting voltage source and said dynamic range adjusting voltage source.

4. The combination of claim 1 further including scene gating means coupled between said control circuit and said positive and negative conditional integrators for passing a selected portion of said scene for controlling said control circuit.

5. The combination of claim 4 in which said scene gating means passes video signals from a selected center portion of said scene.

6. The combination of claim 1 in which said positive and negative conditional integrators each include an integrating capacitor and means for providing a time constant to the response of said integrating capacitor so as to diminish the effect of sharp peaks in controlling said video signal.

7. A level and gain control system responsive to a video signal forming a display raster in an imaging system having an inherent voltage level and dynamic voltage range comprising:

control means responsive to said video signal for controlling the voltage level and dynamic voltage gain of said video signal, said control means having an output terminal, gating means coupled to the output terminal of said control means for passing a selected portion of said raster to an output terminal, positive and negative conditional integrators each having an input terminal and an output terminal with the input terminals coupled to the output terminal of said gating means,, said first and second conditional integrators integrating the video signal as a function of the peak voltages of said gated video data and of the currently integrated value, first and second sample and hold means respectively coupled to said positive and negative conditional integrators, differencing means coupled from said first and second sample and hold means and said control means for controlling the dynamic range of said video signal, and median computing means coupled from said first and second sample and hold means to said control means for controlling the voltage level of said video signal.

* * * * *